W. H. MINEKIME.
REGULATOR.
APPLICATION FILED DEC. 11, 1913.
1,167,776.
Patented Jan. 11, 1916.
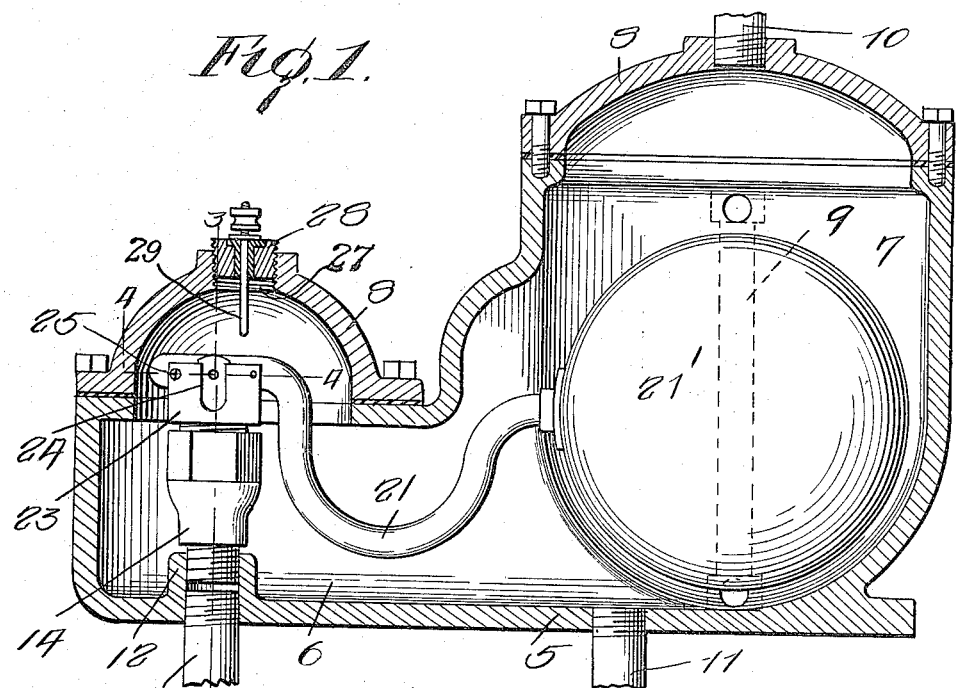
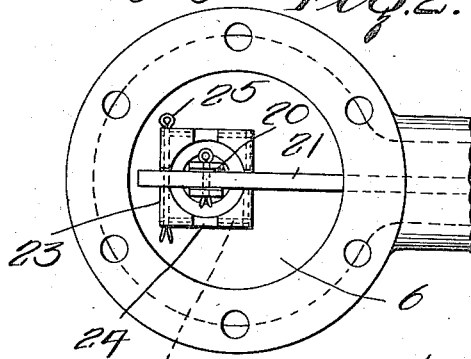
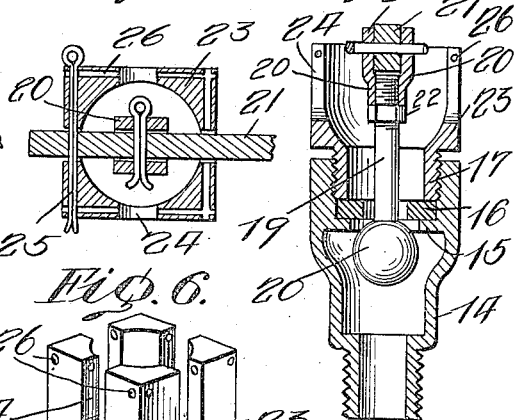
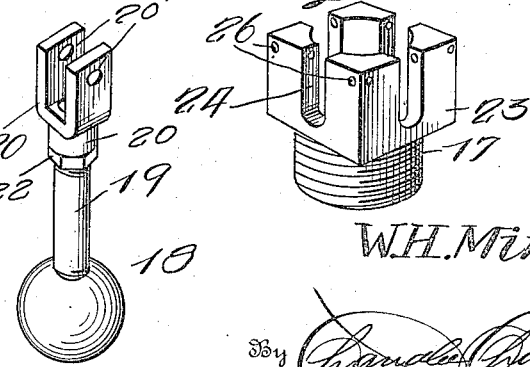
Witnesses
Inventor
W. H. Minekime
Attorneys

UNITED STATES PATENT OFFICE.

WILLIAM H. MINEKIME, OF WATER VALLEY, NEW YORK.

REGULATOR.

1,167,776.  Specification of Letters Patent.  Patented Jan. 11, 1916.

Application filed December 11, 1913. Serial No. 806,013.

*To all whom it may concern:*

Be it known that I, WILLIAM H. MINE-KIME, a citizen of the United States, residing at Water Valley, in the county of Erie, State of New York, have invented certain new and useful Improvements in Regulators; and I do hereby declare the following to be a full, clear, and exact description of the invention, such as will enable others skilled in the art to which it appertains to make and use the same.

This invention relates to new and useful improvements in feed regulators for boilers.

The object of the present invention resides in the provision of a feed regulator for regulating the amount of water fed to a boiler, the invention specifically residing in the provision of such a regulator which is efficient and durable in use and which may be assembled with comparative ease.

A further object of the invention resides in the provision of such a feed regulator wherein the valve seat is readily replaceable, to adapt the regulator for usage with various liquids, as it is understood that the invention may find an application other than the one above stated.

With these and other objects in view, the invention resides in the novel combination, formation and arrangement of parts to be more fully hereinafter described and illustrated in the accompanying drawings and particularly pointed out in the claim hereto appended.

Reference is had to the accompanying drawings wherein similar characters of reference designate corresponding parts throughout the several views, and in which:

Figure 1 is a central vertical sectional view taken through the regulator, Fig. 2 is a top plan view of the valve portion of the regulator, the casing being removed, Fig. 3 is a sectional view on the line 3—3 of Fig. 1, Fig. 4 is a sectional view on the line 4—4 of Fig. 1, Fig. 5 is a perspective view of the valve and stem and Fig. 6 is a perspective view of the sleeve to which is pivoted the float arm.

Referring now more particularly to the drawings, 5 designates the casing of the feed regulator which comprises a valve chamber 6 and a float chamber 7 which is relatively large and which consequently is higher than the valve chamber. The tops of these chambers are closed in a conventional manner by the dome-shaped covers 8. Secured to the side of the float chamber is a water gage 9 and extending from the top of the chamber is a pipe 10 communicating with the boiler above the water line, a pipe 11 extending from the bottom of the chamber and communicating with the boiler below the water line thereof.

The bottom of the valve chamber is provided with an integral inwardly extending nipple 12 in which is threaded one end of the feed pipe 13. Threaded in the nipple 12 and disposed in the valve chamber is a valve casing 14 having formed on the inner periphery thereof intermediate of its ends an annular rib 15. Disposed on this rib and extending inwardly of the edge thereof is an annular band 16 preferably formed of flexible material such as rubber, and forming a valve seat. This ring is held in clamped relation with the rib 15 by a sleeve 17 which is threaded in the upper end of the valve casing.

The valve comprises a ball 18 into which is threaded a stem 19 which is threaded at its upper end to adjustably engage in a sleeve member 20 having at its upper end a pair of vertical arms 20′, embracing and pivoted to one end portion of the float arm 21 which is connected at its other end to the float 21′ vertically movable in the float chamber 7, a jam nut 22 being threaded on the stem below the sleeve and is adapted to engage the lower edge of the same to prevent undesired movement of the ball with relation to the sleeve. It is observed that the central portion of the float arm is bowed downwardly to clear the bottom edge of the inner wall portion of the float chamber, so that the entire structure is very compact.

To provide means associated with the sleeve for pivotally securing the end of the float arm, the sleeve is provided outwardly of the valve casing with a head portion 23 having outer squared faces. The wall of the head 23 is provided at diametrically opposed portions with vertically extending slots 24 which open at the top of the head. The end portion of the float arm is slidably disposed in a pair of these slots and pivotally held in the slot farthest from the float by a pin 25 passed through one of a plurality of bores 26, each extending transversely of a respective slot 24. It is thus observed that the sleeve may be rotated to tightly clamp the valve seat ring 16 and provide at the same time a pivot for the float rod.

The cover 8 of the valve chamber is provided with a bore 27 in which is threaded a removable plug 28 whereby access may be had to the valve without removing the cover. To give a signal when the water rises above the desired level, the plug 28 carries a contact member 29 insulated therefrom and adapted to be engaged by the float arm 21 upon upward movement thereof, to complete an electrical circuit, it being understood that the contact member 29 and the casing are adapted to form the terminals of an electric circuit including suitable signal means.

What is claimed is:

In a liquid regulator, a valve casing, an annular rib provided in the casing, a valve seat resting on said rib, a sleeve threaded in the casing to engage the seat, the other end of the sleeve being provided with pairs of diametrically alined open ended slots, the sleeve being further provided with passages intersecting said slots, a float rod disposed in a pair of said slots, a pin passed through one of the passages detachably pivoted to the float rod, a sleeve having one end pivoted to the float rod within the casing, a valve stem threadedly engaged in the sleeve and a valve on the stem inwardly of the seat.

In testimony whereof, I affix my signature, in the presence of two witnesses.

WILLIAM H. MINEKIME.

Witnesses:
 FRANK H. MOORE,
 MAYME M. MINEKIME.

Copies of this patent may be obtained for five cents each, by addressing the "Commissioner of Patents, Washington, D. C."